Patented Dec. 17, 1946

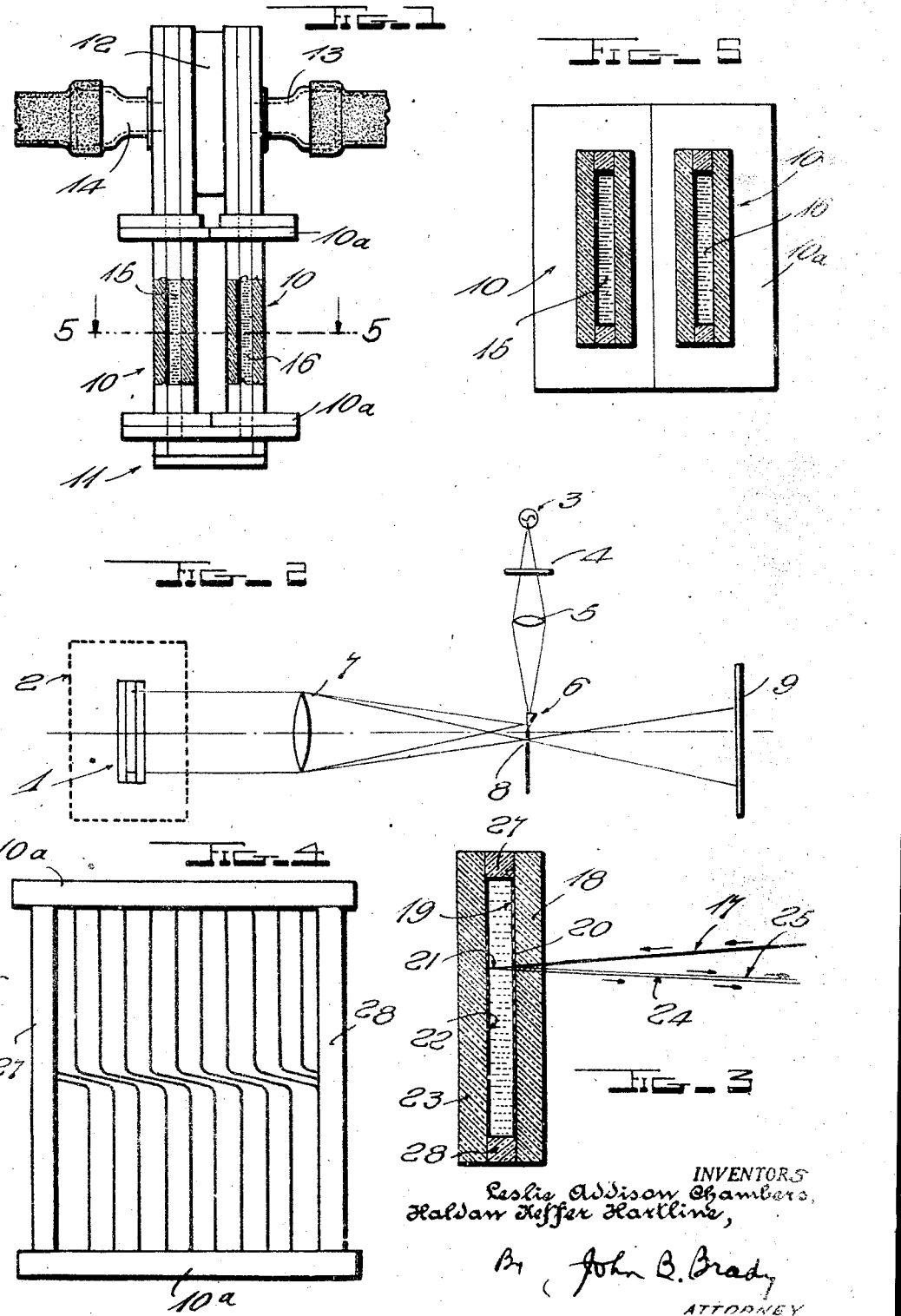

2,412,602

UNITED STATES PATENT OFFICE 2,412,602

ELECTROPHORESIS APPARATUS

Leslie Addison Chambers, Drexel Hill, and Haldan Keffer Hartline, Media, Pa., assignors to The Trustees of the University of Pennsylvania, Philadelphia, Pa., a corporation of Pennsylvania Application September 3, 1942, Serial No. 457,232

7 Claims. (Cl. 88—14)

Our invention relates to optical interferometers, and particularly to their adaptation to the analysis of the kinds and concentrations, relative or absolute, of particles in suspension or solution in a liquid medium. Analysis is accomplished through interferometric measurement of local changes in the refractive index of the suspension or solution produced by the imposition of electrical, centrifugal or gravitational fields, or by diffusion. Any suspension or solution which can be caused by any of the above means to exhibit such local changes in refractive index may be analyzed according to the method of our invention. These local changes in refractive index are evidence of concentration gradients.

In one of the methods of the practice of our invention, concentration gradients are obtained by permitting the migration of charged particles of solute through a fixed voltage gradient. The several kinds of particles move in direction and with velocity determined by the nature of their charge. This usually results in a stratification of the various kinds of solute particles. (If concentration gradients are produced by centrifugal or gravitational fields, the rate and extent of stratification are determined by the relative masses of the solute particles.) The formation, rate of movement, number and magnitude of the local refractive index gradients which are caused by the concentration gradients are detected by the interferometric method (to be described). Information may thereby be obtained concerning the mass, charge, size and/or absolute or relative concentrations of the several solute constituents. The interferometric method of detection combines sensitivity with compactness.

One of the objects of our invention is to provide an apparatus which affords greatly increased sensitivity and a large reduction in the size of the necessary apparatus over other apparatus and methods usually employed.

Still another object of our invention is to provide an apparatus which will combine increased sensitivity and reduced size with means for actually separating and isolating the various solutes in complex mixtures, for further study outside the apparatus.

Another object of our invention is to provide an apparatus for the analysis of serum and of such complex body fluids as plasma, synovial fluids, pleural exudates, urine, etc., as an adjunct in the diagnosis of certain diseases, which combines sensitivity and compactness through the use of the interferometric method of measurement.

often found in the form wherein the concentration gradients are produced by a fixed voltage gradient (electrophoresis), it is not our intention to in any way limit our invention to this embodiment, which we use below solely to illustrate our invention.

Referring to the accompanying drawing, Figure 1 is a side elevation of one possible arrangement of the interferometer unit for the application of a fixed voltage gradient; Fig. 2 is a typical schematic diagram of the essential components of the optical system; Fig. 3 illustrates the essential light paths in the interferometer cell itself; Fig. 4 shows the appearance of a typical photograph of the projected image of the interference fringes showing a concentration gradient between portions of the solution being studied, the photograph being taken from the front of one of the cells; and Fig. 5 is a section taken on line 5—5 of the cell shown in Fig. 1.

Measurement of the interference fringe spacing and displacement is correlated with other information to disclose the mass, charge, size and concentrations of the solutes involved.

The essential features of the illustrated embodiment of our invention may best be understood by referring to Fig. 2, wherein 1 represents the interferometer-electrophoresis cell submerged in the temperature controlled bath 2. The interferometer cell is illuminated and observed by the optical system shown. Light from the lamp 3 (preferably a vapor lamp) passes through the filter 4 to render it monochromatic, thence through the condensing lens 5 which brings the rays to convergence in a small spot on the reflecting surface of prism 6. The light is directed by the prism 6 to collimating lens 7, which is located at its focal distance from the point of convergence. The collimated beam then falls upon an interferometer portion of cell 1 placed at approximately twice the focal distance from lens 7. The reflected beam is directed through aperture 8 and comes to focus on the photographic plate 9, which is at approximately twice the focal distance from lens 7 and is thus receiving a real image of cell 1. Alternatively, the cell 1 may be placed closer to lens 7 and a photographic objective lens placed at 8 to form a real image of the interference fringes on the plate 9.

In Fig. 1 is shown one possible combination of interferometer and electrophoresis cell. The interferometer portions 10, shown in section as Fig. 5, constitute the center sections of a closed U tube of rectangular cross-section designated the interferometer portions 10. The cells comprise transparent plates 18—23 separated by spacer members 27—28. Part 11, made up of glass plates, forms the bottom of the U and the assembly 12 makes up the top of the U. This section has two outlet tubes 13 and 14 which are used to communicate liquid in the U tube under examination with two appropriate glass vessels containing the electrodes for introduction of the electric current. The joints between tubes 13 and 14 and the tubes on the electrode vessels are usually sealed by means of pieces of rubber tubing. It will be noted that the entire assembly is in the familiar form, in general, whereby the center portions 10 may be displaced laterally with respect to either or both of the bottom and top sections. In this way it is possible to isolate portions of the solution in the U tube whenever it is so desired.

The construction of the interferometer portions of the cell is best considered by reference to Fig. 3. This figure shows the construction of what is known as the "reflecting" or "autocollimating" type of interferometer, and is used merely to illustrate the type of interferometer, and not to limit the interferometer to this particular design. The apparatus can incorporate the "transmission" interferometer as well. The latter type is so constructed that the light source and photographic apparatus are on opposite sides of the interferometer. It is not intended to limit detection of the interference fringes to a photographic surface. Any suitable means may be employed, such as a telescope, scanning photoelectric cell, etc. Returning to Fig. 3, number 17 indicates a ray of light entering the interferometer from lens 7. This ray passes through the transparent plate 18 and strikes a semi-reflecting coating 19 on inner surface 20 of plate 18. This coating 19 is of such thickness that it transmits part and reflects part of the incident ray 17 in a definite ratio determined by the theoretical analysis of the system. The transmitted portion 21 of ray 17 passes through the solution being examined and strikes the totally reflecting coating 22 on the inner surface of plate 23. The ray is reflected by this surface through the solution once more and impinges on the partial mirror 19, where part of it is reflected and part transmitted to form ray 24. The reflected portion of the ray suffers a number of multiple reflections between the two mirror surfaces. Each time it strikes surface 19, however, it loses part of its energy as a returning ray. These rays help to increase (or decrease) the fringe intensity and thus contribute to the contrast ratio or resolving power of the interferometer. There is a theoretical optimum ratio of reflectance to transmittance of film 19 at which value the interference fringes are the brightest and sharpest. The portion of the original ray 17 which is reflected from coating 19 is designated by 25. With the conditions of illumination as outlined herein, rays 24 and 25 are in a state and position to cause interference with each other. Whether they actually interfere or reinforce each other depends entirely upon the path difference of rays 24 and 25, and in effect depends only upon the time required for ray 21 to traverse the solution in both directions. This time is controlled directly by the index of refraction of the solution at that particular spot.

In order to obtain interference fringes which will be useful for measurement and recording purposes, surfaces 20 and 22 are inclined to each other about a vertical axis, thus enclosing a column of liquid having a wedge shaped cross-section. The actual dimensional difference in thickness from side 27 to side 28 is such as to give from 10 to 20 fringes (5 to 10 wavelengths) across the width of the cell with the solvent in the cell. In order to assure fringes which are straight and parallel, the inner faces of plates 18 and 23 are made flat within a very small fraction of a light wave (e. g., $1/20$). The fringes are held parallel to the sides of the cell by accurate control of the dimensions of the spacer members 27 and 28 between the plates. The amount of the inclination of surfaces 20—22 is so slight that this does not show in the drawing. However, if lines were drawn through the planes of the surfaces 20—22 these lines would intersect in a point substantially remote from the cell. Fig. 4 is an illustration of the appearance of the interference fringes at the boundary of two strata wherein exists a concentration gradient as is impressed on the photographic plate 9.

We have found the method of our invention highly practical and efficient in operation. We realize that modifications may be made in carrying out the method of our invention and we intend no limitations upon our invention other than may be imposed by the scope of the appended claims.

What we claim as new and desire to secure by Letters Patent of the United States is as follows:

1. The method of analyzing solutions which comprises confining the solution under observation between a pair of interferometer plates, subjecting the solution therebetween to electrophoresis, passing rays of monochromatic light through the solution, and recording the interference pattern produced by said interferometer plates for determining the characteristics of the solution.

2. Apparatus for analyzing solutions comprising a source of monochromatic light, a cell for the solution having plane wall portions, one of which extends in a plane that is angularly disposed with respect to the plane of the adjacent wall portion to provide a confining cell for the solution having slightly diverging walls, means for directing monochromatic light through said last mentioned wall for reflection by each of said walls, optical means for directing the reflected light to a light sensitive photographic plate, and means for effecting a migration of the particles in said cell for recording interference fringes established in said cell according to the characteristics of the solution therein.

3. The method of analyzing solutions which comprises confining the solution under observation between a pair of interferometer plates, subjecting the solution therebetween to electrophoresis, passing rays of monochromatic light through the solution, and optically observing the interference pattern produced by said interferometer plates for determining the characteristics of the solution.

4. Apparatus for analyzing solutions comprising a source of monochromatic light, a cell for the solution having plane wall portions, one of which extends in a plane that is angularly disposed with respect to the plane of the adjacent wall portion to provide a confining cell for the solution having slightly diverging walls, means for directing monochromatic light through said last mentioned wall for reflection by each of said walls, optical means for directing the reflected light to an optical observing means, and means for effecting a migration of the particles in said cell for optically observing interference fringes established in said cell according to the characteristics of the solution therein.

5. A system of analysis comprising a cell for solution under examination having a horizontally tapered chamber for the formation of optical interference fringes, a source of monochromatic light directed upon said chamber, the surface of the rear wall of said tapered chamber being provided with a reflector for said monochromatic light after the passage thereof through said chamber, and means optically aligned with said chamber in substantially the same transverse plane through said light source and said tapered chamber for observing the interference pattern resulting from the reflection of the monochromatic light between the cell walls.

6. A system of analysis comprising a cell for solution under examination, said cell comprising a pair of plane walls, one of said walls being disposed in a plane at a slight angle with respect to the plane of the opposite wall, a semi-reflecting surface on the interior face of one of said walls, a totally reflecting surface on the interior face of the other of said walls, a source of monochromatic light directed through the semi-reflecting surface of said cell upon the reflecting surface thereof, and means for observing the interference pattern resulting from the reflection of the monochromatic light between the cell walls.

7. A system of analysis comprising a cell for solution under examination, said cell comprising a pair of plane walls disposed in diverging relation with respect to each other, a semi-reflecting surface on the interior face of one of said walls, a totally reflecting surface on the interior face of the other wall, a source of monochromatic light directed upon the totally reflecting surface of said last mentioned cell wall through the semi-reflecting surface of the first mentioned wall of said cell, and means optically aligned with said source of monochromatic light for recording the interference pattern resulting from the reflection of the monochromatic light between the cell walls.

LESLIE ADDISON CHAMBERS.
HALDAN KEFFER HARTLINE.